US012724374B2

(12) United States Patent
Ho

(10) Patent No.: US 12,724,374 B2
(45) Date of Patent: Sep. 1, 2026

(54) MULTIFUNCTION PERIPHERAL AND OPERATION METHOD THEREOF

(71) Applicant: Kinpo Electronics, Inc., New Taipei City (TW)

(72) Inventor: Pei-Chi Ho, New Taipei City (TW)

(73) Assignee: Kinpo Electronics, Inc., New Taipei City (TW)

( * ) Notice: Subject to any disclaimer, the term of this patent is extended or adjusted under 35 U.S.C. 154(b) by 0 days.

(21) Appl. No.: 19/033,514

(22) Filed: Jan. 22, 2025

(65) Prior Publication Data

US 2026/0169422 A1 Jun. 18, 2026

(30) Foreign Application Priority Data

Dec. 18, 2024 (CN) ......................... 202411873426.8

(51) Int. Cl.
*G03G 15/00* (2006.01)

(52) U.S. Cl.
CPC ..... *G03G 15/6582* (2013.01); *G03G 15/6573* (2013.01); *G03G 2215/00691* (2013.01)

(58) Field of Classification Search
CPC ..... G03G 2215/00691; G03G 15/6573; G03G 15/6582
See application file for complete search history.

(56) References Cited

U.S. PATENT DOCUMENTS

| | | | | | |
|---|---|---|---|---|---|
| 5,649,627 | A * | 7/1997 | Wako | G07D 11/50 53/54 |
| 6,144,814 | A * | 11/2000 | Newell, Jr. | G03G 15/6564 399/23 |
| 2005/0002053 | A1* | 1/2005 | Meador | H04N 1/4446 358/1.14 |
| 2008/0204815 | A1* | 8/2008 | Kazama | H04N 1/00363 358/401 |
| 2008/0232827 | A1* | 9/2008 | Yamaguchi | G03G 15/6582 399/16 |
| 2008/0304109 | A1* | 12/2008 | Ishida | B65H 29/60 358/1.14 |

(Continued)

FOREIGN PATENT DOCUMENTS

| | | |
|---|---|---|
| JP | S59130582 | 7/1984 |
| JP | 2000159410 | 6/2000 |

(Continued)

*Primary Examiner* — Carla J Therrien
(74) *Attorney, Agent, or Firm* — JCIPRNET

(57) ABSTRACT

A multifunction peripheral includes a body, a switch, multiple first drive roller assemblies, a printing module, a shredding module, and a control module. The body has a first channel, a second channel, and a third channel. The second channel is connected to the first channel and forms a loop with a part of the first channel. The third channel is connected to the second channel. The switch is disposed at the junction of the second channel and the third channel. The first drive roller assemblies are disposed on the first channel and the second channel. The printing module is on the first channel. The shredding module is below the first channel and the second channel. The third channel extends from the second channel to the shredding module. The control module is electrically connected to the switch, the first drive roller assemblies, the printing module, and the shredding module.

11 Claims, 8 Drawing Sheets

(56) References Cited

U.S. PATENT DOCUMENTS

| | | | | |
|---|---|---|---|---|
| 2009/0121057 | A1* | 5/2009 | Brown, Sr. | B02C 18/0007 241/203 |
| 2015/0174941 | A1* | 6/2015 | Osada | B42C 9/0081 412/37 |
| 2018/0170077 | A1* | 6/2018 | Nistor | G03G 15/5062 |

FOREIGN PATENT DOCUMENTS

| | | |
|---|---|---|
| JP | 2010091652 | 4/2010 |
| JP | 2022152894 | 10/2022 |

* cited by examiner

PT1: P11 → P12
PT2: CH4 → P12
PT3: P11 → P12 → P13 → P14 → P12
PT4: CH4 → P12 → P13 → P14 → P12
PT5: P11 → P12 → P13 → CH3

CH1 {P11, P12} CH2 {P13, P14} 240 {140, 241}

MULTIFUNCTION PERIPHERAL AND OPERATION METHOD THEREOF

CROSS-REFERENCE TO RELATED APPLICATION

This application claims the priority benefit of China application serial no. 202411873426.8, filed on Dec. 18, 2024. The entirety of the above-mentioned patent application is hereby incorporated by reference herein and made a part of this specification.

BACKGROUND

Technical Field

The disclosure relates to a multifunction peripheral and an operation method thereof.

Description of Related Art

Printers or peripherals with printing functions have become essential functional devices for word processing or office use. However, regarding documents that are printed by mistake or have expired, if not processed, then it is prone to the leakage of trade secrets or personal privacy. Therefore, among the existing office equipment, professional shredders are needed to shred the discarded paper files. Therefore, printing equipment and shredders play an increasingly important role in offices.

However, not all offices have enough space to install the required number of printing equipment and shredders. Meanwhile, the operation of the existing paper shredder still requires manual feeding of paper one by one. Therefore, providing office equipment that has both printing and shredding functions is a topic that relevant technicians need to consider.

SUMMARY

The disclosure is directed to a multifunction peripheral and an operation method thereof, which has both automatic printing and automatic shredding functions.

According to an embodiment of the disclosure, a multifunction peripheral includes a body, a switch, a plurality of first drive roller assemblies, a printing module, a shredding module, and a control module. The body has a first channel, a second channel, and a third channel, in which the second channel is connected to the first channel and forms a loop with a part of the first channel, and the third channel is connected to the second channel. The switch is disposed at the junction of the second channel and the third channel. The first drive roller assemblies are respectively configured on the first channel and the second channel. The printing module is disposed in the body and on the first channel of the loop. The shredding module is disposed in the body and below the first channel and the second channel. The third channel extends from the second channel to the shredding module, and a shredding roller of the shredding module is disposed at an end of the third channel away from the second channel. The control module is electrically connected to the switch, the first drive roller assemblies, the printing module, and the shredding module. The control module connects an upstream of the second channel and the third channel through the switch and closes a downstream of the second channel, or connects the upstream and the downstream of the second channel through the switch and closes the third channel.

According to an embodiment of the disclosure, an operation method of a multifunction peripheral is used for the multifunction peripheral as described above. At least one paper to be shredded is placed at an inlet of the first channel. The operation method includes the following. The user activates the shredding function and enters the operation mode. When the user enters a first shredding mode, the control module transfers the paper to be shredded to the first channel through the drive roller assembly, and then transfers to an outlet of the first channel after passing through the printing module. The control module drives the switch to connect the upstream of the second channel and the third channel and close the downstream of the second channel. The control module drives the drive roller assembly to reverse, so as to transfer the paper to be shredded from the outlet of the first channel to the third channel through the upstream of the second channel. The control module drives the shredding roller of the shredding module to shred the paper to be shredded.

According to an embodiment of the disclosure, the multifunction peripheral includes a body, a first switch, a second switch, a plurality of first drive roller assemblies, a printing module, a first shredding module, a second shredding module, and a control module. The body has a first channel, a second channel, a third channel, and a fourth channel, in which the second channel is connected to the first channel and forms a loop with a part of the first channel, the third channel is connected to the first channel, and the fourth channel is connected to the second channel. The first switch is disposed at the junction of the third channel and the first channel. The second switch is disposed at the junction of the second channel and the fourth channel. The first drive roller assemblies are respectively configured on the first channel and the second channel. The printing module is disposed in the body and on the first channel of the loop. The first shredding module is disposed in the body and below the first channel and the second channel. The third channel extends from the first channel to the first shredding module, and the first shredding roller of the first shredding module is disposed at an end of the third channel away from the first channel. The second shredding module is disposed in the body and below the first channel and the second channel. The fourth channel extends from the second channel to the second shredding module, and a second shredding roller of the second shredding module is disposed at an end of the fourth channel away from the second channel. The control module is electrically connected to the first switch, the second switch, the first drive roller assemblies, the printing module, the first shredding module, and the second shredding module. The control module connects a section one and a section two of the first channel and closes the third channel through the first switch, or connects the section one and the third channel and closes the section two through the first switch. The control module connects the upstream of the second channel and the fourth channel through the second switch and closes the downstream of the second channel, or connects the upstream and the downstream of the second channel through the second switch and closes the fourth channel.

According to an embodiment of the disclosure, an operation method of a multifunction peripheral is used for the multifunction peripheral as described above. At least one paper to be shredded is placed at the inlet of the first channel. The operation method includes the following. The user activates the shredding function and enters the operation mode. When the user enters the first shredding mode, the control module drives the first switch to connect the section one and the third channel and close the section two, the control module drives the first drive roller assembly to transfer the paper to be shredded to the section one, and then transfer to the first shredding module through the third channel, and the control module drives the first shredding roller to shred the paper to be shredded. When the user enters the second shredding mode, the control module drives the first switch to connect the section one and the section two and close the third channel, the control module drives the second switch to connect the upstream of the second channel and the fourth channel and close the downstream of the second channel, the control module transfers the paper to be shredded to the first channel through the first drive roller assembly, and then transfers to the outlet of the first channel after passing through the printing module. The control module drives the first drive roller assembly to reverse, so as to transfer the paper to be shredded from the outlet of the first channel to the fourth channel through the upstream of the second channel, and the control module drives the second shredding roller of the second shredding module to shred the paper to be shredded.

Based on the above, the multifunction peripheral is configured through the channels in the body and matched with the printing module, the shredding module, and the switch, in which the second channel is connected to the first channel and forms the loop with a part of the first channel, so that the printing module may be disposed on the first channel of the loop. Also, the third channel is connected to the second channel, and the switch is disposed at the junction of the second channel and the third channel, so that the shredding roller of the shredding module is disposed at the end of the third channel away from the second channel. Accordingly, the control module of the multifunction peripheral can provide the printing function or the shredding function through adjusting the switch, and since the components are substantially arranged in a stacked manner, the overall area occupied by the equipment can be effectively reduced, thereby facilitating the planning of extra space.

DESCRIPTION OF THE EMBODIMENTS

Figure 1:
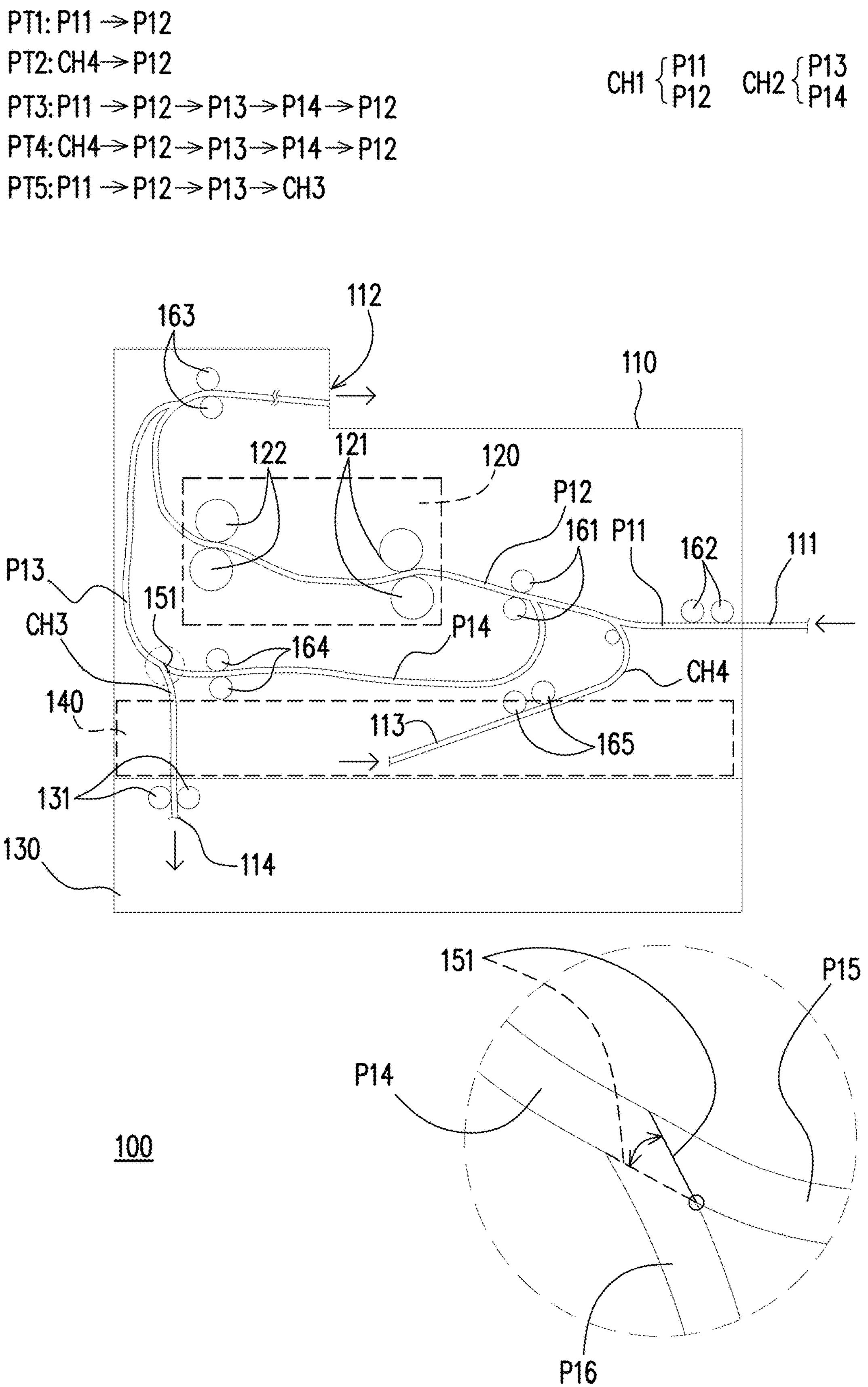
FIG. 1 is a simplified side view of a multifunction peripheral according to an embodiment of the disclosure.

Reference will now be made in detail to exemplary embodiments of the disclosure, examples of the embodiments are illustrated in the accompanying drawings. Whenever possible, the same reference signs are used in the drawings and the description to refer to the same or like parts.

Figure 2:
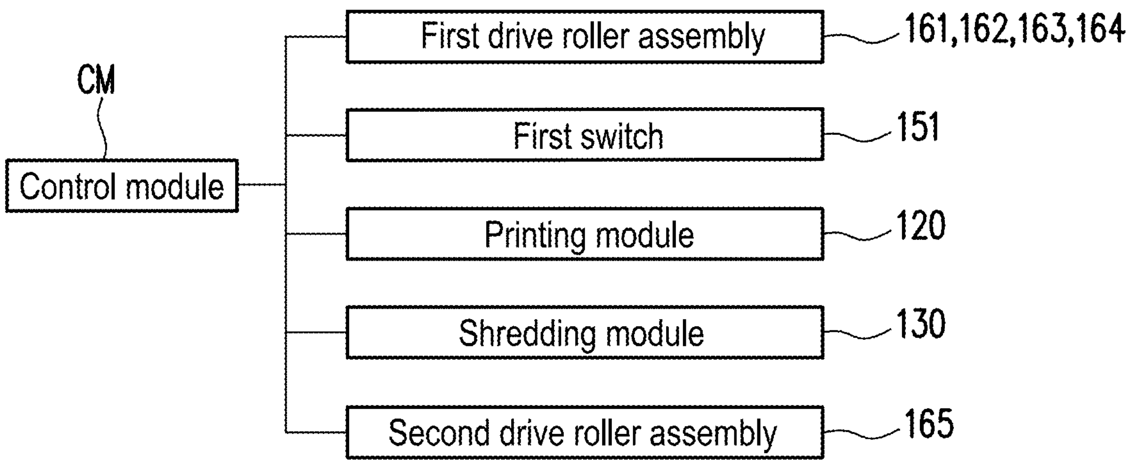
FIG. 2 shows the electrical connection relationships of related components of the multifunction peripheral of FIG. 1.

FIG. 1 is a simplified side view of a multifunction peripheral according to an embodiment of the disclosure. FIG. 2 shows the electrical connection relationships of related components of the multifunction peripheral of FIG. 1. Referring to FIG. 1 and FIG. 2, a multifunction peripheral 100 includes a body 110, a switch 151, a plurality of first drive roller assemblies 161, 162, 163, 164, a printing module 120, a shredding module 130, and a control module CM. The body 110 has a first channel CH1, a second channel CH2, and a third channel CH3, in which the second channel CH2 is connected to the first channel CH1 and forms a loop with a part of the first channel CH1, and the third channel CH3 is connected to the second channel CH2. The switch 151 is disposed at the junction of the second channel CH2 and the third channel CH3.

The printing module 120 is disposed in the body 110 and on the first channel CH1 of the loop. The shredding module 130 is disposed in the body 110 and below the first channel CH1 and the second channel CH2. The third channel CH3 extends from the second channel CH2 to the shredding module 130, and a shredding roller 131 of the shredding module 130 is disposed at the end of the third channel CH3 away from the second channel CH2. The control module CM is electrically connected to the switch 151, the first drive roller assemblies 161 to 164, the printing module 120, and the shredding module 130. Here, the printing module 120 is exemplified by a laser printing unit, but not limited thereto, and includes a transfer roller assembly 121 and a fixing roller assembly 122, in which the transfer roller assembly 121 is used to transfer the image toner to the paper, and then the fixing roller assembly 122 is used to pressurize and heat the patterned toner for fixing. Since the printing process is known to the related art devices, the details will not be described here. Furthermore, the shredding roller 131 of the shredding module 130 is formed by, for example, a rotating blade, a paper comb, and a drive motor. The paper transferred to the shredding module 130 is fed in between the interlocking blades, cut into a large number of small paper pieces, and then stacked in an accommodating space of the shredding module 130 to achieve the purpose of confidentiality.

In addition, the first drive roller assemblies 161 to 164 are respectively disposed on the first channel CH1 and the second channel CH2, in which the first channel CH1 includes a section one P11 and a section two P12, the section one P11 is connected to an inlet 111, and the section two P12 is connected to an outlet 112. The first drive roller assembly 161 is, for example, a registration roller, and is used to confirm that the paper (not shown) indeed enters the section two P12 of the first channel CH1. After the operation is known and confirmed, the control module CM determines whether to drive the printing module 120 to print the entered paper. The first drive roller assembly 162 is, for example, a paper pickup-separation roller, and is used to pick up the paper at the inlet 111, separate the paper from other papers, and feed the picked-up paper into the first channel CH1. The first drive roller assembly 163 is, for example, a paper output roller, and is used to send the paper passed through the first channel CH1 out of the body 110 through the outlet 112. Also, the first drive roller assembly 164 is, for example, a driving roller for double-sided printing, and cooperates with the first drive roller assembly 163. For example, after the paper passes through the printing module 120 and completes the initial printing, the paper is clamped and transferred by the first drive roller assembly 163, then, the control module CM may drive the first drive roller assembly 163 to reverse, and then drive the first drive roller assembly 164 at the second channel CH2, so that the paper may be smoothly transferred to an upstream P13 and a downstream P14 of the second channel CH2 and then enter the section two P12 of the first channel CH1 again. At this time, the paper is flipped over and the other side is being printed by the printing module 120. After the second printing is completed, the double-sided printed content may be sent out of the body 110 through the outlet 112 by the first drive roller assembly 163.

The two printing processes are shown in FIG. 1 as a first path PT1 (from the section one P11 to the section two P12) and a third path PT3 (from the section one P11 to the section two P12, the upstream P13, the downstream P14, and the section two P12 in sequence), the former is a single-sided printing path, while the latter is a double-sided printing path.

In addition, the multifunction peripheral 100 further includes a paper tray 140 disposed in the body 110 and between the printing module 120 and the shredding module 130. The third channel CH3 passes through the paper tray 140, the paper tray 140 has the fourth channel CH4 connected to the section two P12 of the first channel CH1, and the junction of the fourth channel CH4 and the first channel CH1 is positioned before the printing module 120. Therefore, during the printing process of the multifunction peripheral 100, the paper may be provided by the paper tray 140 instead, that is, a second path PT2 (single-sided printing) and a fourth path PT4 (double-sided printing) shown in FIG. 1.

It is worth noting that since the multifunction peripheral 100 of this embodiment further has the shredding function, based on the corresponding configuration of the third channel CH3 and the switch 151, the control module CM of the multifunction peripheral 100 may take corresponding measures according to the selection of the user. Generally speaking, during the printing process, especially during the double-sided printing, since the paper passes through the second channel CH2, in order to prevent the paper from mistakenly entering the third channel CH3, the control module CM drives the switch 151 to connect the upstream P13 and the downstream P14 of the second channel CH2 but close the third channel CH3 (the switch 151 is switched to as indicated by the dashed line in FIG. 1), so that the paper may be smoothly transferred through the third path PT3 or the fourth path PT4.

On the other hand, when the user wants to shred paper, then the control module CM drives the switch 151 to connect the upstream P13 of the second channel CH2 and the third channel CH3 but close the downstream P14 of the second channel CH2, so that the paper enters the first channel CH1 from the inlet 111 and right before about to be sent out of the body 110 by the first drive roller assembly 163, and the control module CM drives the first drive roller assembly 163 to reverse. At this time, the control module CM drives the switch 151 to switch to the position indicated by the solid line in FIG. 1, so that the paper may smoothly enter the third channel CH3 from the upstream P13, and then be shredded by the shredding roller 131 of the shredding module 130 and discharged to the accommodating space of the shredding module 130 through the shredder outlet 114. In other words, the shredding path is a fifth path PT5 shown in FIG. 1.

On the other hand, in order to provide a further encryption effect to the paper to be shredded, the multifunction peripheral 100 of this embodiment may further provide an encrypted shredding function. The details are as the following. First, still as in the shredding path (the fifth path PT5), the control module CM drives the first drive roller assemblies 162 and 161 to transfer the paper to the first channel CH1 and allow the paper to pass through the printing module 120. Next, the control module drives the printing module 120 to print an encryption pattern on the paper. The type of pattern is not limited herein, which may be numbers, letters, special characters, or symbols, and the operation is equivalent to reprinting the paper, so that the subsequent pattern may cover the original information of the paper so that the information cannot be recognized. At this point, after the encryption printing is completed, the paper is transferred to the shredding module 130 along the remaining path of the fifth path PT5 for shredding. In other words, the encrypted shredding is consistent with the shredding path, merely that the encryption printing is required when the paper passes through the printing module 120. In addition, for the paper that is double-sided printed, it is notable that after printing the encryption pattern on one side of the paper, the paper needs to be driven to run a part of the third path PT3, that is, after passing through the upstream P13 and the downstream P14 again to be flipped over, the paper passes through the printing module 120 again to allow encryption printing to be performed on the other side of the paper, and then is transferred to the third channel CH3 through the upstream P13 to be shredded.

To summarize the two shredding operations, corresponding operation modes may be provided on the multifunction peripheral 100 for the user to select. For example, the previous shredding operation and the subsequent encrypted shredding operation are respectively regarded as a first shredding mode and a second shredding mode. After the user activates the shredding function of the multifunction peripheral 100, an operation panel (not shown) on the body 110 displays the two options for the user to select.

Figure 3:
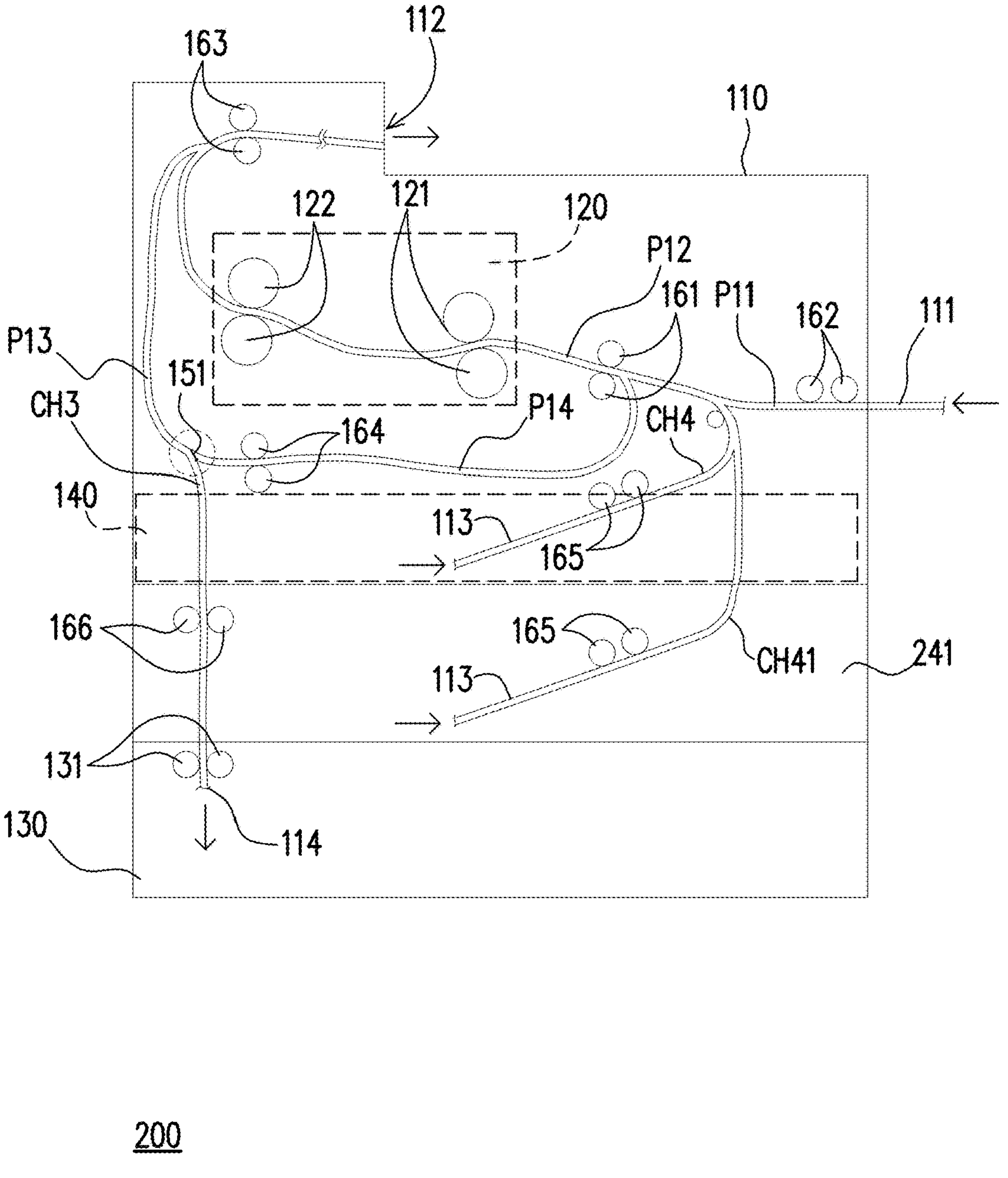
FIG. 3 is a simplified side view of the multifunction peripheral according to another embodiment of the disclosure.
Figure 4:
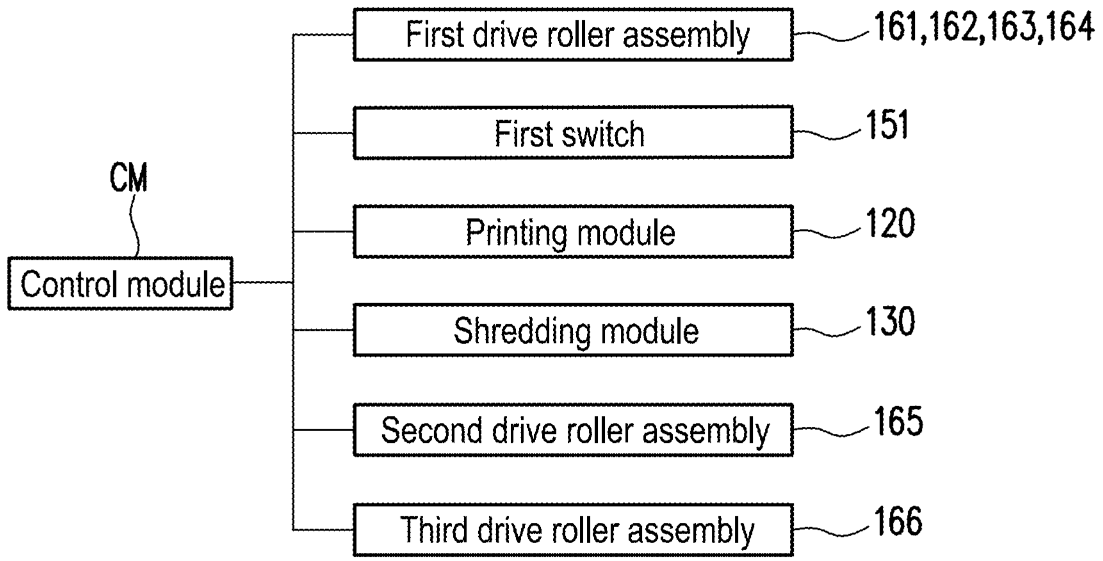
FIG. 4 shows the electrical connection relationships of related components of the multifunction peripheral of FIG. 3.

FIG. 3 is a simplified side view of the multifunction peripheral according to another embodiment of the disclosure. FIG. 4 shows the electrical connection relationships of related components of the multifunction peripheral of FIG. 3. Referring to FIG. 3 together with FIG. 4, the difference from the foregoing embodiment is that, in a multifunction peripheral 200 of this embodiment, another paper tray 241 is additionally added and stacked below the paper tray 140. Therefore, a newly added fourth channel CH41 and a first drive roller assembly 165 are required to be provided accordingly, and further the shredding module 130 is stacked at the bottom layer of the overall structure. That is, the third channel CH3 passes through the paper tray 140 and the paper tray 241 in sequence. Accordingly, in order to allow the paper to be smoothly transferred along the shredding path (the fifth path PT5), the present embodiment further includes a third drive roller assembly 166, which is disposed in the paper tray 241 and on the third channel CH3. In this way, during the printing process, the multifunction peripheral 200 have the additional paper tray 241 for supplying paper. Here, the components with the same reference signs as in the previous embodiment have the same functions as described above, so details will not be repeated here.

Figure 5:
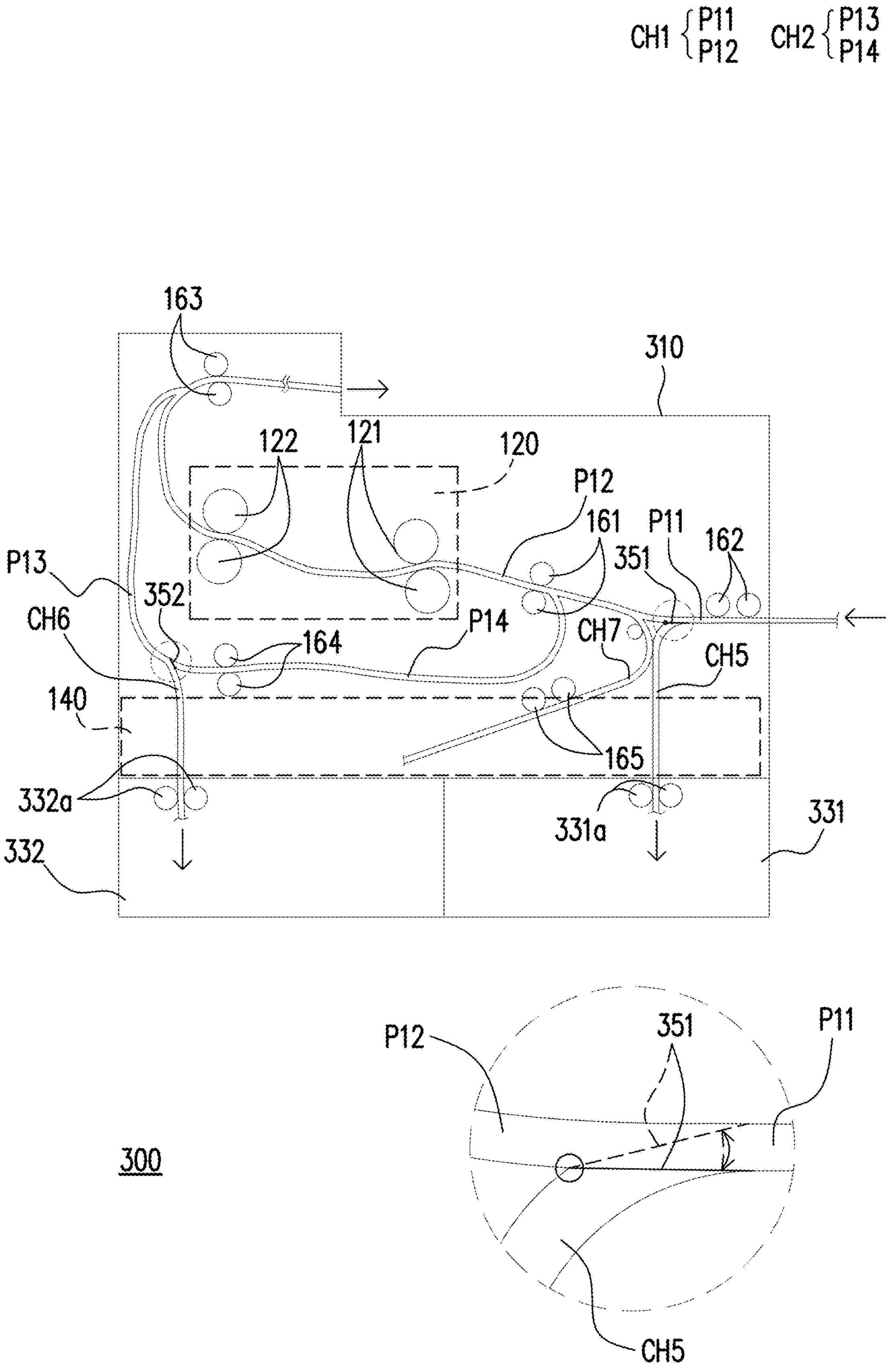
FIG. 5 is a simplified side view of the multifunction peripheral according to another embodiment of the disclosure.
Figure 6:
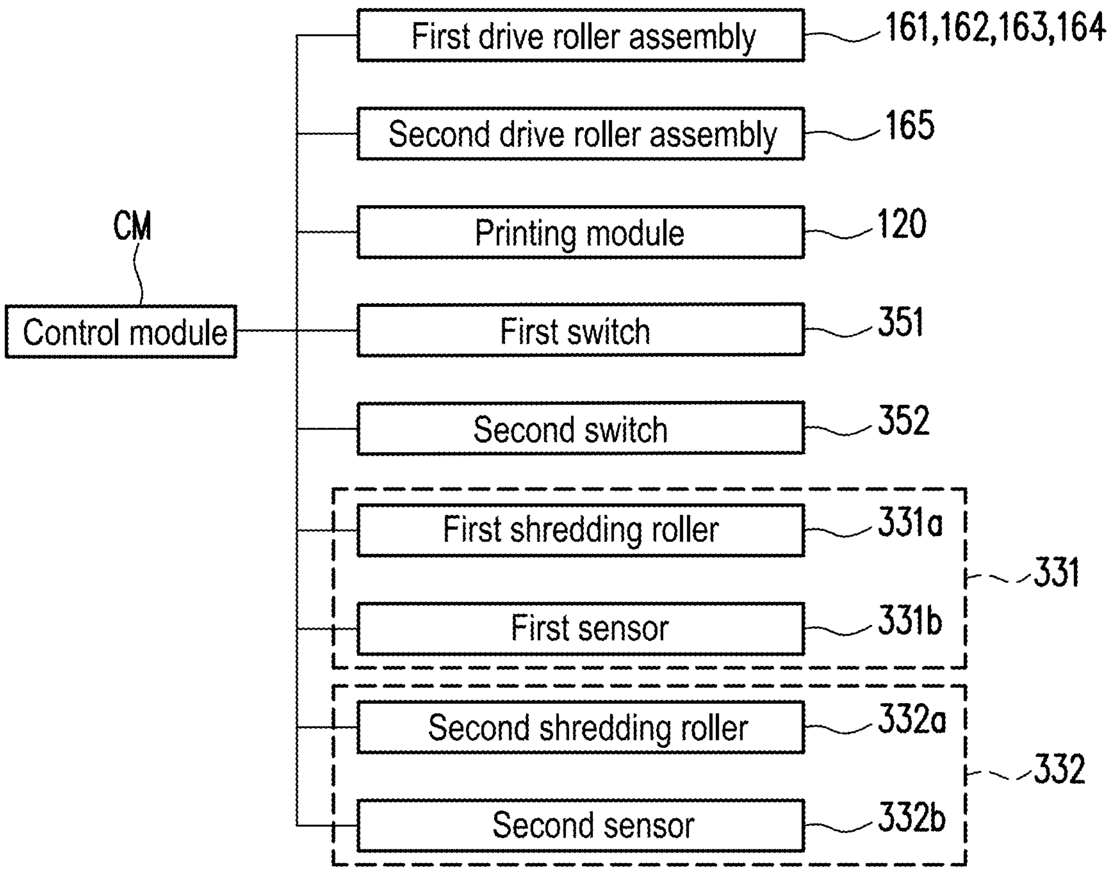
FIG. 6 shows the electrical connection relationships of related components of the multifunction peripheral of FIG. 5.

FIG. 5 is a simplified side view of the multifunction peripheral according to another embodiment of the disclosure. FIG. 6 shows the electrical connection relationships of related components of the multifunction peripheral of FIG. 5. Referring to FIG. 5 together with FIG. 6 (and comparing with FIG. 1), a multifunction peripheral 300 is substantially configured as shown in FIG. 1, but the difference is that the multifunction peripheral 300 of this embodiment includes a first shredding module 331 and a second shredding module 332, in which the second shredding module 332 is the same as the shredding module 130, a second shredding roller 332*a* is the same as the shredding roller 131, a fourth channel CH6 is the same as the third channel CH3, and a second switch 352 is the same as the switch 151. Accordingly, the paper to be shredded may sequentially pass through the first channel CH1 and the upstream P13 of the second channel CH2 and then enter the fourth channel CH6, so as to be shredded by the second shredding roller 332*a* of the second shredding module 332 and then stored in the accommodating space of the second shredding module 332.

Furthermore, different from the foregoing embodiment, the present embodiment further has a third channel CH5 and a first switch 351, in which the third channel CH5 is connected to the section one P11 of the first channel CH1 and extends from the section one P11, passes through the paper tray 140, and extends to the first shredding module 331. Here, the control module CM drives the first switch 351 to connect the section one P11 and the section two P12 of the first channel CH1 and close the third channel CH5, or connect the section one P11 and the third channel CH5 through the first switch 351 and close the section two P12. The former allows the paper to be smoothly transferred from the section one P11 to the section two P12 so as to be smoothly printed or shredded by the second shredding module 332, while the latter allows the multifunction peripheral 300 to directly perform the shredding operation with the first shredding module 331.

In brief, to summarize the two shredding operations, related options may be displayed on the operation panel of the multifunction peripheral 300 for the user to select. At the same time, with the encrypted shredding operation being added, the user of this embodiment may choose from three shredding modes when activating the shredding function, in which the first shredding mode allows the paper to enter the first shredding module 331, the second shredding mode allows the paper to enter the second shredding module 332, and in the third shredding mode, before the paper enters the second shredding module 332, encryption printing is performed on the paper by the printing module 120. In another embodiment, since the paper conveying path is the same, merely two shredding modes may be provided, namely, the first shredding mode and the second shredding mode, in which the first shredding mode is the same as in the foregoing embodiment, and the second shredding mode is equivalent to the third shredding mode in the embodiment.

On the other hand, as shown in FIG. 6, the first shredding module 331 of this embodiment further includes a first sensor 331*b* electrically connected to the control module CM for sensing the shredding capacity of the first shredding module 331. The second shredding module 332 further includes a second sensor 332*b* electrically connected to the control module CM for sensing the shredding capacity of the second shredding module 332. In this way, when the user activates the shredding function, the control module CM may make a determination based on the above content. When the shredding capacity of the first shredding module 331 reaches a preset value but the shredding capacity of the second shredding module 332 does not reach the preset value, the control module CM does not display the first shredding mode but displays the second shredding mode and the third shredding mode for the user to select and provides a warning signal. On the other hand, when the shredding capacity of the first shredding module 331 does not reach the preset value but the shredding capacity of the second shredding module 332 reaches the preset value, the control module CM does not display the second shredding mode or the third shredding mode, but displays the first shredding mode to the user and provides another warning signal. In another embodiment, the control module CM may further make a determination merely based on the shredding capacity of the first shredding module 331 and the shredding capacity of the second shredding module 332 to provide two different shredding modes.

Figure 7:
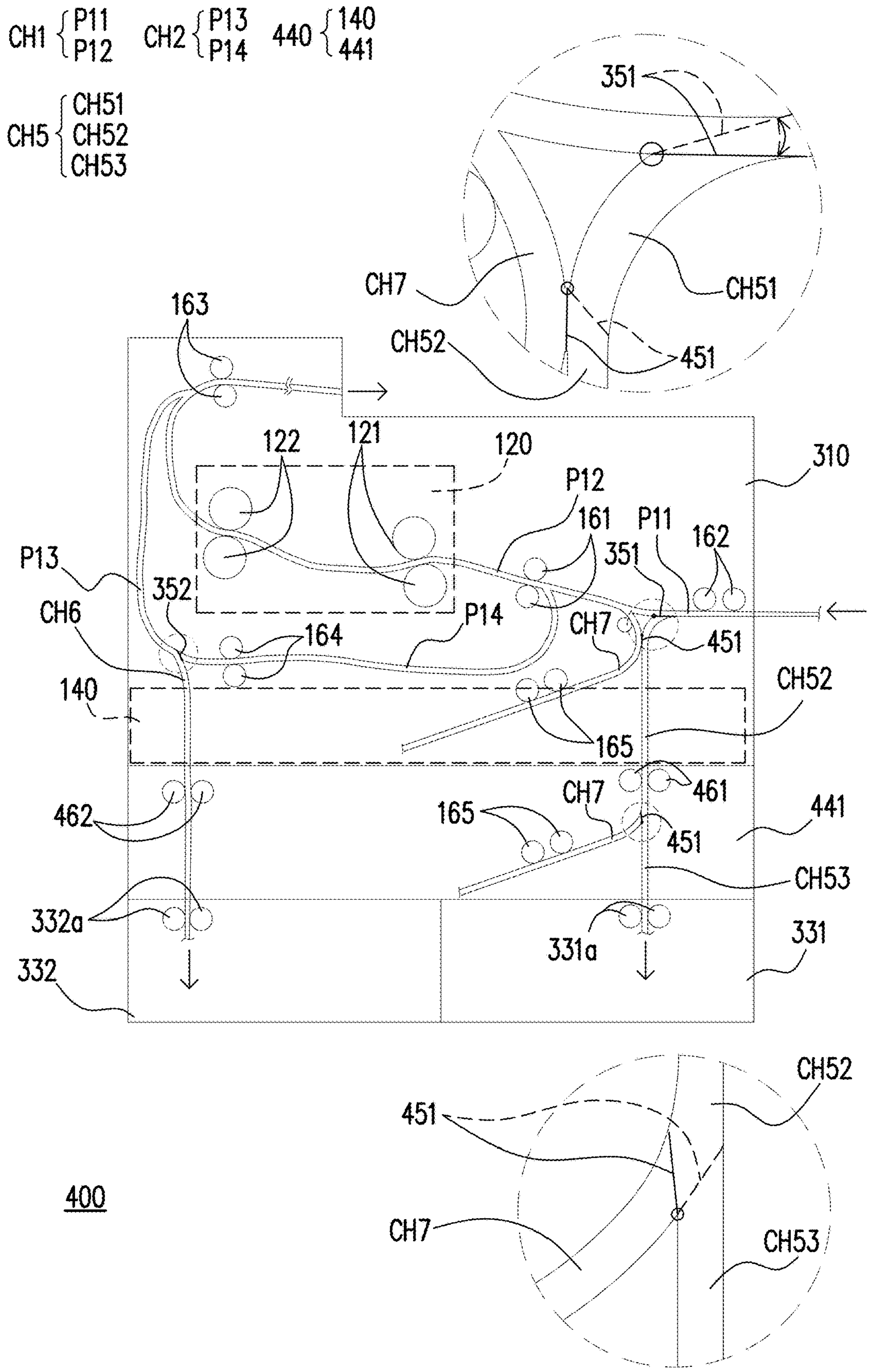
FIG. 7 is a simplified side view of the multifunction peripheral according to another embodiment of the disclosure.
Figure 8:
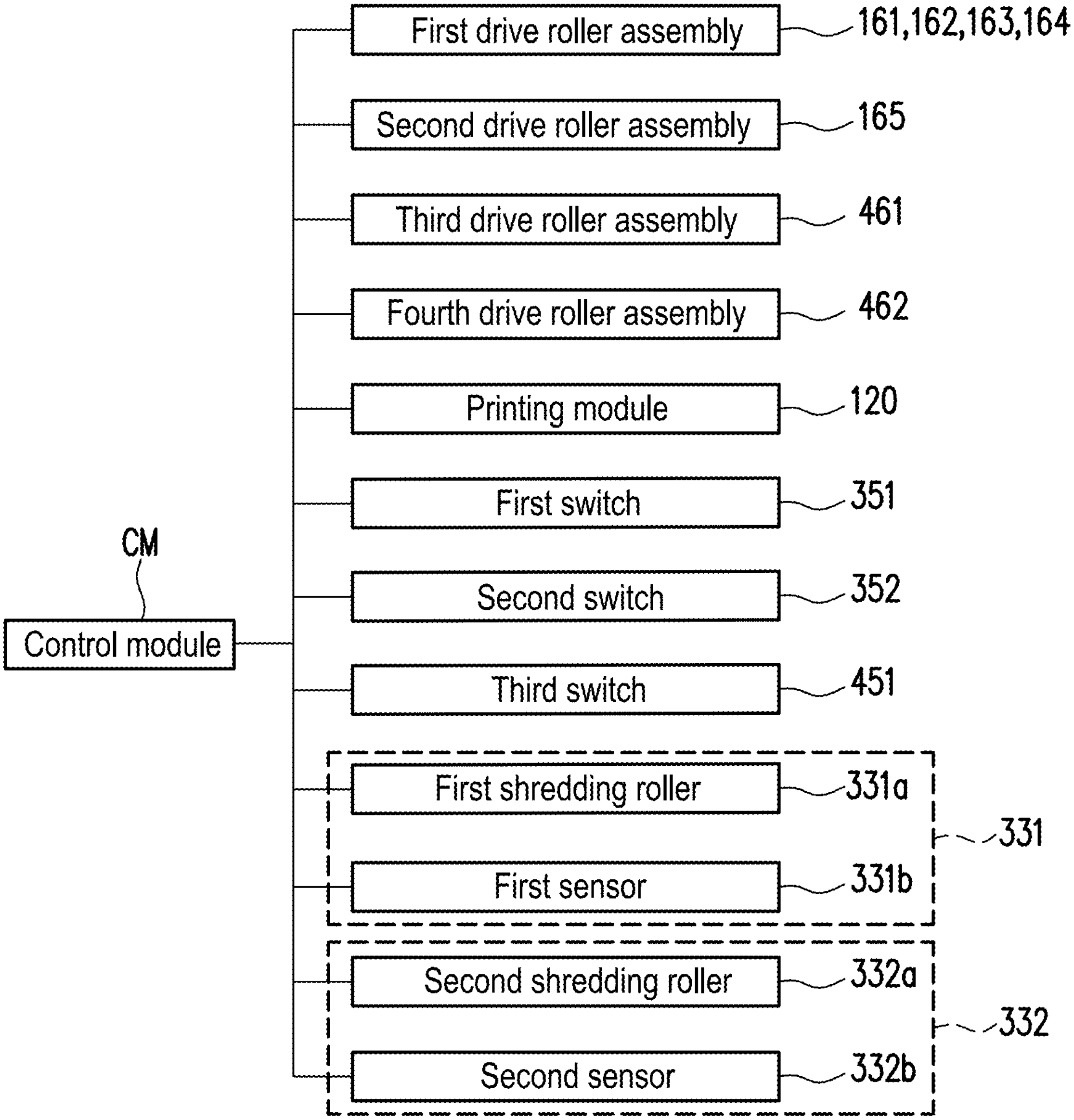
FIG. 8 shows the electrical connection relationships of related components of the multifunction peripheral of FIG. 7.

FIG. 7 is a simplified side view of the multifunction peripheral according to another embodiment of the disclosure. FIG. 8 shows the electrical connection relationships of related components of the multifunction peripheral of FIG. 7. Referring to FIG. 7 together with FIG. 8 (and comparing with FIG. 5 or FIG. 3), comparing with FIG. 5, a multifunction peripheral 400 of this embodiment further includes another paper tray 441, which is stacked below the paper tray 140 and between the paper tray 140 and the first shredding module 331 and the second shredding module 332. That is, the first shredding module 331 and the second shredding module 332 of this embodiment still need to be arranged at the bottom layer of the overall structure. As shown in the difference between FIG. 3 and FIG. 1, the newly added paper tray 441 needs to have a corresponding newly added second drive roller assembly 165 for paper feeding. At the same time, the fourth channel CH6 passes through the paper tray 441, and thus a fourth drive roller assembly 462 is required to be added, so as to facilitate transferring the paper from the fourth channel CH6 to the second shredding module 332.

Comparing FIG. 7 with FIG. 5, in the multifunction peripheral 400 of the present embodiment, due to the paper tray 441 and the fifth channel CH7 being partially overlapped, and the third channel CH5 being partially overlapped, a plurality of third switches 451 are further disposed, each electrically connected to the control module CM, and each third switch 451 is disposed at a junction between each fifth channel CH7 and the third channel CH5. Here, the third channel CH5 is divided into an upstream CH51, a midstream CH52, and a downstream CH53, in which the upstream CH51 is connected to the section one P11 of the first channel CH1, the midstream CH52 is connected to the fifth channel CH7, and the downstream CH53 is connected to the first shredding module 331. Accordingly, the control module CM connects the upstream CH51, the midstream CH52, and the downstream CH53 of the third channel CH5 through the third switch 451 but closes the fifth channels CH7 (as shown in FIG. 7, 451 in the upper and lower drawings moves to the position indicated by the solid line), or connects the fifth channels CH7 and the midstream CH52 through the third switch 451 but closes the upstream CH1 and the downstream CH3 (as shown in FIG. 7, 451 in the upper and lower drawings moves to the position indicated by the dashed line). The former configuration connects the section one P11 and the upstream CH51 in conjunction with the first switch 351, so that the multifunction peripheral 400 may smoothly perform the shredding operation of sending the paper to the first shredding module 331. On the contrary, the latter operation connects the section one P11 and the section two P12 in conjunction with the first switch 351, so that the multifunction peripheral 400 may smoothly perform the printing operation of taking paper from the paper tray 140 or taking paper from the paper tray 441.

In addition, similar to the embodiments shown in FIG. 5 and FIG. 6, the first shredding module 331 and the second shredding module 332 each have a first sensor 331*b* and a second sensor 332*b* for sensing the shredding capacity, and accordingly, the user is reminded to clean the first shredding module 331 or the second shredding module 332.

In summary, in the embodiments of the disclosure, the multifunction peripheral is configured through the channels in the body and matched with the printing module, the shredding module, and the switch, in which the second channel is connected to the first channel and forms the loop with a part of the first channel, so that the printing module may be disposed on the first channel of the loop. Also, the third channel is connected to the second channel, and the switch is disposed at the junction of the second channel and the third channel, so that the shredding roller of the shredding module is disposed at the end of the third channel away from the second channel. In the configuration of the shredding module, the printing module may further be driven by the control module, and after encryption printing is performed on the paper, the paper is sent to the shredding module. This operation can further protect the contents on the paper and prevent the content from leaking out.

In another embodiment, the multifunction peripheral provides shredding modules both near the inlet and away from the inlet, and together with the configuration of channels and switches, the users are allowed to select the desired shredding mode. That is, the former can improve the shredding efficiency because the shredding module is near the inlet, while the latter, as mentioned above, since the paper passes through the printing module first, encryption printing may be performed on the paper before shredding. Meanwhile, in another embodiment, the multifunction peripheral respectively sets sensors in the different shredding modules to facilitate sensing the shredding capacity in the shredding module, the sensing results are reflected on the options for the user to select, and corresponding warning information is provided to inform the user.

Based on the above, the control module of the multifunction peripheral can provide the printing function or the shredding function by adjusting the switch, thereby improving work efficiency and reducing work costs. Furthermore, since the components are substantially stacked, the overall area occupied by the equipment can be effectively reduced to save space. The different embodiments allow the shredding module to be flexibly configured on the body, so that users can flexibly use and match.

Finally, it should be noted that the embodiments are merely used to illustrate the technical solutions of the disclosure, rather than to limit the disclosure. Although the disclosure has been described in detail with reference to the foregoing embodiments, persons skilled in the art should understand that the technical solutions described in the foregoing embodiments may still be modified, or some or all of the technical features thereof may be replaced by equivalents. However, the modifications or substitutions do not make the essence of the corresponding technical solutions deviate from the scope of the technical solutions of the embodiments of the disclosure.

What is claimed is:

1. A multifunction peripheral, comprising:

a body comprising a first channel, a second channel, a third channel, and a fourth channel, wherein the second channel is connected to the first channel and forms a loop with a part of the first channel, the third channel is connected to the first channel, and the fourth channel is connected to the second channel;

a first switch disposed at a junction of the third channel and the first channel;

a second switch disposed at a junction of the second channel and the fourth channel;

a plurality of first drive roller assemblies respectively disposed on the first channel and the second channel;

a printing module disposed in the body and on the first channel of the loop;

a first shredding module disposed in the body and below the first channel and the second channel, wherein the third channel extends from the first channel to the first shredding module, and a first shredding roller of the first shredding module is disposed at an end of the third channel away from the first channel;

a second shredding module disposed in the body and below the first channel and the second channel, wherein the fourth channel extends from the second channel to the second shredding module, and a second shredding roller of the second shredding module is disposed at an end of the fourth channel away from the second channel; and a control module electrically connected to the first switch, the second switch, the plurality of first drive roller assemblies, the printing module, the first shredding module, and the second shredding module, wherein the control module connects a section one and a section two of the first channel through the first switch and closes the third channel, or connects the section one and the third channel through the first switch and closes the section two, the control module connects an upstream of the second channel to the fourth channel through the second switch and closes a downstream of the second channel, or connects the upstream and the downstream of the second channel through the second switch and closes the fourth channel.

2. The multifunction peripheral according to claim 1, wherein the first shredding module further comprises a first sensor electrically connected to the control module for sensing a shredding capacity of the first shredding module, the second shredding module further comprises a second sensor electrically connected to the control module for sensing a shredding capacity of the second shredding module.

3. The multifunction peripheral according to claim 1, further comprising:

at least one paper tray disposed in the body and between the printing module and the first shredding module and the second shredding module, wherein the third channel and the fourth channel pass through the paper tray respectively, and the paper tray has a fifth channel connected to the first channel, wherein a junction of the fifth channel and the first channel is positioned before the printing module and positioned after a junction of the first channel and the third channel; and at least one second drive roller assembly electrically connected to the control module and positioned on the fifth channel, wherein the control module is adapted to transfer paper from the paper tray to the first channel through the fifth channel by the second drive roller assembly.

4. The multifunction peripheral according to claim 3, wherein the at least one paper tray comprises a plurality of paper trays stacked between the printing module and the shredding module, and the multifunction peripheral further comprises:

at least one third drive roller assembly electrically connected to the control module, wherein the third drive roller assembly is disposed on at least one of the paper trays and on the third channel; and at least one fourth drive roller assembly electrically connected to the control module, wherein the fourth drive roller assembly is disposed on at least one of the paper trays and on the fourth channel.

5. The multifunction peripheral according to claim 4, wherein a plurality of fifth channels partially overlap with each other but do not overlap with the third channel.

6. The multifunction peripheral according to claim 4, wherein a plurality of fifth channels partially overlap each other and partially overlap the third channel, and the multifunction peripheral further comprises:

a plurality of third switches electrically connected to the control module, wherein each of the third switches is disposed at a junction of each of the fifth channels and the third channel, the third channel is divided into an upstream, a midstream, and a downstream, the upstream is connected to the first channel, the midstream is connected to the fifth channels, the downstream is connected to the first shredding module, and the control module connects the upstream, the midstream, and the downstream of the third channel through the third switches but closes the fifth channels, or connects the fifth channels and the midstream through the third switches but closes the upstream and the downstream.

7. An operation method of a multifunction peripheral, for the multifunction peripheral according to claim 1, wherein at least one paper to be shredded is placed at an inlet of the first channel, and the operation method comprises:

activating a shredding function and entering an operation mode by a user;

in response to the user entering a first shredding mode, driving, by the control module, the first switch to connect the section one and the third channel and close the section two, driving, by the control module, the plurality of first drive roller assemblies to transfer the paper to be shredded to the section one, and then transfer the paper to be shredded to the first shredding module through the third channel, and driving, by the control module, the first shredding roller to shred the paper to be shredded; and in response to the user entering a second shredding mode, driving, by the control module, the first switch to connect the section one and the section two and close the third channel, driving, by the control module, the second switch to connect the upstream of the second channel and the fourth channel and close the downstream of the second channel, transferring, by the control module, the paper to be shredded to the first channel through the plurality of first drive roller assemblies, and then transferring to an outlet of the first channel after passing through the printing module, driving, by the control module, the plurality of first drive roller assemblies to reverse, so as to transfer the paper to be shredded from the outlet of the first channel to the fourth channel through the upstream of the second channel, and driving, by the control module, the second shredding roller of the second shredding module to shred the paper to be shredded.

8. The operation method of the multifunction peripheral according to claim 7, further comprising:

in response to the user selecting a third shredding mode, driving, by the control module, the first switch to connect the section one and the section two and close the third channel, driving, by the control module, the second switch to connect the upstream of the second channel and the fourth channel and close the downstream of the second channel, transferring, by the control module, the paper to be shredded to the printing module through the plurality of first drive roller assemblies, and driving the printing module to print an encryption pattern on the paper to be shredded, and then transferring the paper to be shredded to the outlet of the first channel, driving, by the control module, the plurality of first drive roller assemblies to reverse, so as to transfer the paper to be shredded from the outlet of the first channel to the fourth channel through the upstream of the second channel, and driving, by the control module, the second shredding roller of the second shredding module to shred the paper to be shredded.

9. The operation method of the multifunction peripheral according to claim 8, wherein the first shredding module further comprises a first sensor electrically connected to the control module for sensing a shredding capacity of the first shredding module, the second shredding module further comprises a second sensor electrically connected to the control module for sensing a shredding capacity of the second shredding module, and the operation method further comprises:

in response to the user activating the shredding function, obtaining, by the control module, the shredding capacity of the first shredding module and the shredding capacity of the second shredding module through the first sensor and the second sensor, wherein in response to the shredding capacity of the first shredding module reaching a preset value but the shredding capacity of the second shredding module not reaching the preset value, not displaying, by the control module, the first shredding mode, but displaying the second shredding mode and the third shredding mode for the user to select, and providing a warning signal, wherein in response to the shredding capacity of the first shredding module not reaching the preset value but the shredding capacity of the second shredding module reaching the preset value, not displaying, by the control module, the second shredding mode and the third shredding mode, but displaying the first shredding mode for the user, and providing another warning signal.

10. The operation method of the multifunction peripheral according to claim 7, further comprising:

in response to the user entering the second shredding mode and the paper to be shredded passing through the printing module, driving, by the control module, the printing module to print an encryption pattern on the paper to be shredded.

11. The operation method of the multifunction peripheral according to claim 7, wherein the first shredding module further comprises a first sensor electrically connected to the control module for sensing a shredding capacity of the first shredding module, the second shredding module further comprises a second sensor electrically connected to the control module for sensing a shredding capacity of the second shredding module, and the operation method further comprises:

in response to the user activating the shredding function, obtaining, by the control module, the shredding capacity of the first shredding module and the shredding capacity of the second shredding module through the first sensor and the second sensor, in response to the shredding capacity of the first shredding module reaching a preset value but the shredding capacity of the second shredding module not reaching the preset value, not displaying, by the control module, the first shredding mode, but displaying the second shredding mode for the user to select, and providing a warning signal, in response to the shredding capacity of the first shredding module not reaching the preset value but the shredding capacity of the second shredding module reaching the preset value, not displaying, by the control module, the second shredding mode, but displaying the first shredding mode for the user, and providing another warning signal.

* * * * *